United States Patent
Kim

[11] Patent Number: 5,825,100
[45] Date of Patent: Oct. 20, 1998

[54] INTELLIGENT BATTERY POWER SYSTEM

[75] Inventor: Man-seob Kim, Seoul, Rep. of Korea

[73] Assignee: Samsung Electronics Co., Ltd., Kyungki-do, Rep. of Korea

[21] Appl. No.: 692,442

[22] Filed: Aug. 5, 1996

Related U.S. Application Data

[63] Continuation of Ser. No. 233,939, Apr. 28, 1994, abandoned.

[30] Foreign Application Priority Data

Apr. 28, 1993 [KR] Rep. of Korea ............... 93-7217

[51] Int. Cl.[6] ................... H02J 9/06; G03F 1/00
[52] U.S. Cl. ................ 307/66; 307/64; 307/65; 307/86; 307/150; 364/707; 395/750.08
[58] Field of Search ............ 429/9, 61; 307/66, 307/48, 64, 80, 65, 150, 85, 86; 364/492, 707; 395/750.08; 365/226, 229

[56] References Cited

U.S. PATENT DOCUMENTS 5,021,983  6/1991  Nguyen ................... 364/707
5,184,025  2/1993  McCurry et al. .
5,300,874  4/1994  Shimamoto et al. ........... 320/15
5,316,868  5/1994  Dougherty et al. ............ 429/9
5,553,294  9/1996  Nanno et al. ................. 395/750

*Primary Examiner*—Thorl Chea
*Attorney, Agent, or Firm*—Leydig, Voit & Mayer, Ltd.

[57] ABSTRACT

An intelligent battery power system having a main battery and a swap battery including a battery presence detector for detecting whether the main battery is present and a power controller for operating the system in a suspend mode and applying power from the swap battery in a suspend mode when the battery presence detector detects that the main battery has been removed and for interrupting the power from the swap battery with power supplied from the main battery to operate the system in a resume mode when the battery presence detector detects that the main battery is present. The system prevents volatile data from being lost when the battery for a portable computer is removed or becomes detached for any reason.

12 Claims, 11 Drawing Sheets

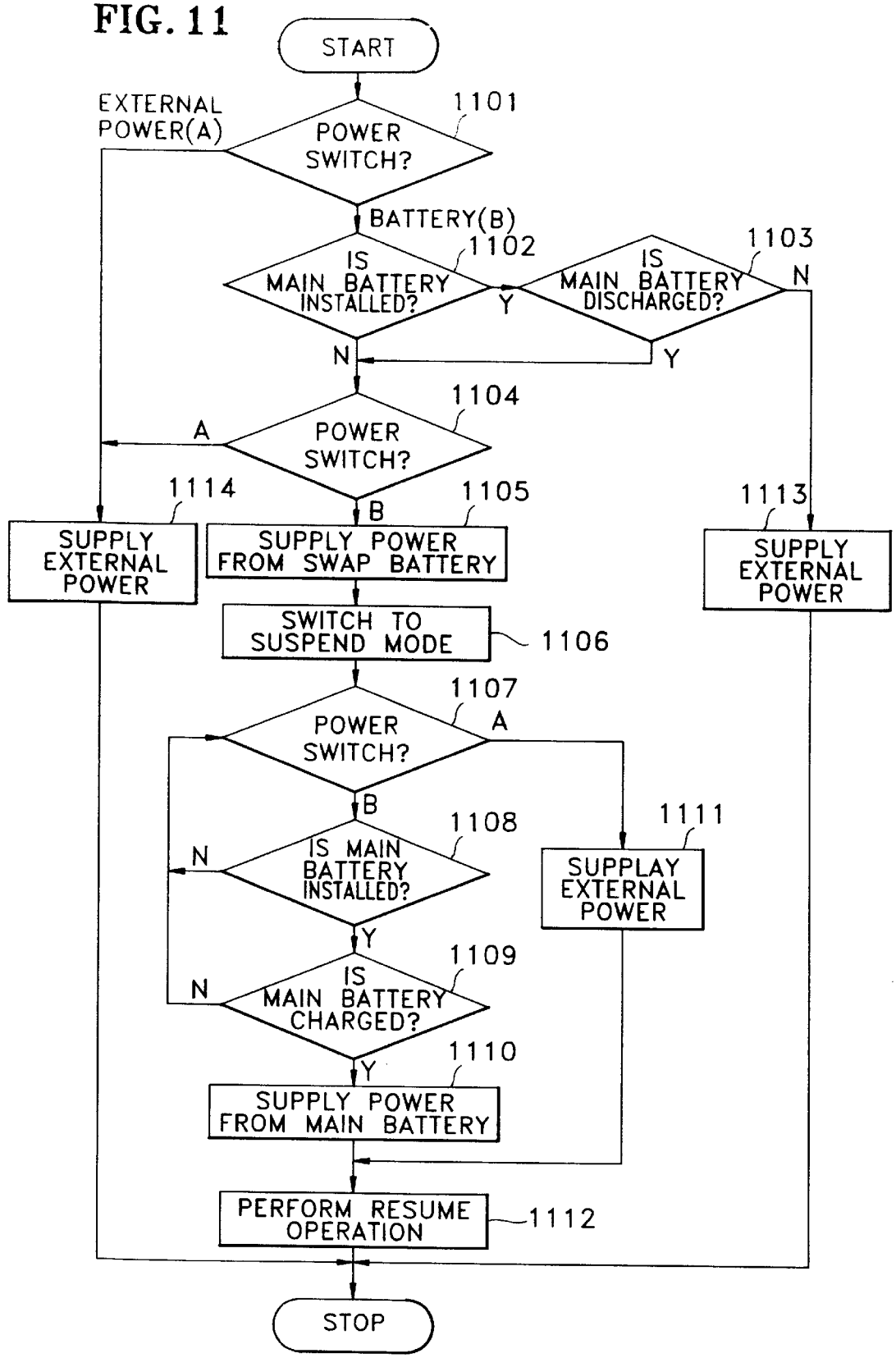

INTELLIGENT BATTERY POWER SYSTEM

This disclosure is a continuation of patent application Ser. No. 08/233,939, filed Apr. 28, 1994, now abandoned.

BACKGROUND OF THE INVENTION

The present invention relates to an intelligent battery power system adoptable for a portable computer, which can perform suspend and resume operations based on the installation state of a battery.

In general, portable electronic systems such as notebook computers or pen-based personal computers incorporate battery power, and are convenient to carry but cannot be operated constantly for long periods of time due to the limited supply power, i.e., batteries. Therefore, most such systems are equipped with a countermeasure feature for saving power. For example, a battery-powered system has the function of shutting off the power supply to sections which draw large amounts of current if it is determined that the user is not using the system. Also, most of these systems include switches for selecting the power supply, that is, to receive power from the batteries or from an external power source via an AC adapter, at the user's discretion.

Therefore, if it is determined that the battery has been discharged to a dangerously low state, the user can be warned accordingly. Upon recognizing such a condition, the user should connect the AC adapter to an external power source and operate a power switch so that power can be supplied through the AC adapter. If an external power connection is unavailable, the batteries must be changed, and, in the case of a portable computer, data should be saved on a disk in order to prevent volatile data from being lost at the time of interrupting the power. The performance of such steps is troublesome and inconvenient to the user.

To solve such a problem, U.S. Pat. No. 5,230,074 discloses a power management system in which interrupts are executed in a low battery power state. Here, the power supply for a dynamic random access memory (DRAM) is maintained with a standby battery during main battery replacement. Computer operation is resumed after installing another main battery.

However, in the above patent, if a low battery state is not detected and the main battery becomes detached or is removed for any reason, such as user carelessness, a suspend interrupt is not generated. Therefore, although the DRAM power supply is maintained by the standby battery, since the central processing unit (CPU) power supply is cut off without its information being stored in the DRAM, data is lost.

Moreover, during normal operation, the main battery charges the standby battery which supplies power to the DRAM, thus shortening the life of the main battery. Also, the standby battery can only be charged up to the state of the main battery, which may be low. Therefore, unless the main battery is removed and replaced with sufficient speed, the power supply to the DRAM will stop prematurely due to the unusually short supply of standby power, thereby resulting in data loss.

SUMMARY OF THE INVENTION

Therefore, it is an object of the present invention to provide an intelligent battery power system which can solve the above problems.

To accomplish the object, there is provided a battery power system having a main battery and a swap battery, the system comprising: battery presence detecting means for detecting the presence of the main battery; and power control means for operating the system in a suspend mode and applying power from the swap battery to the system, when the battery presence detecting means detects that the main battery is absent, and for interrupting the power from the swap battery with power supplied from the main battery to operate the system in a resume mode when the battery presence detecting means detects that the main battery is present.

BRIEF DESCRIPTION OF THE DRAWINGS

The above objects and advantages of the present invention will become more apparent by describing in detail a preferred embodiment thereof with reference to the attached drawings in which:

FIG. 11 is a flowchart for explaining the operation of the power controller shown in FIG. 10.

DETAILED DESCRIPTION OF THE INVENTION

Figure 1:
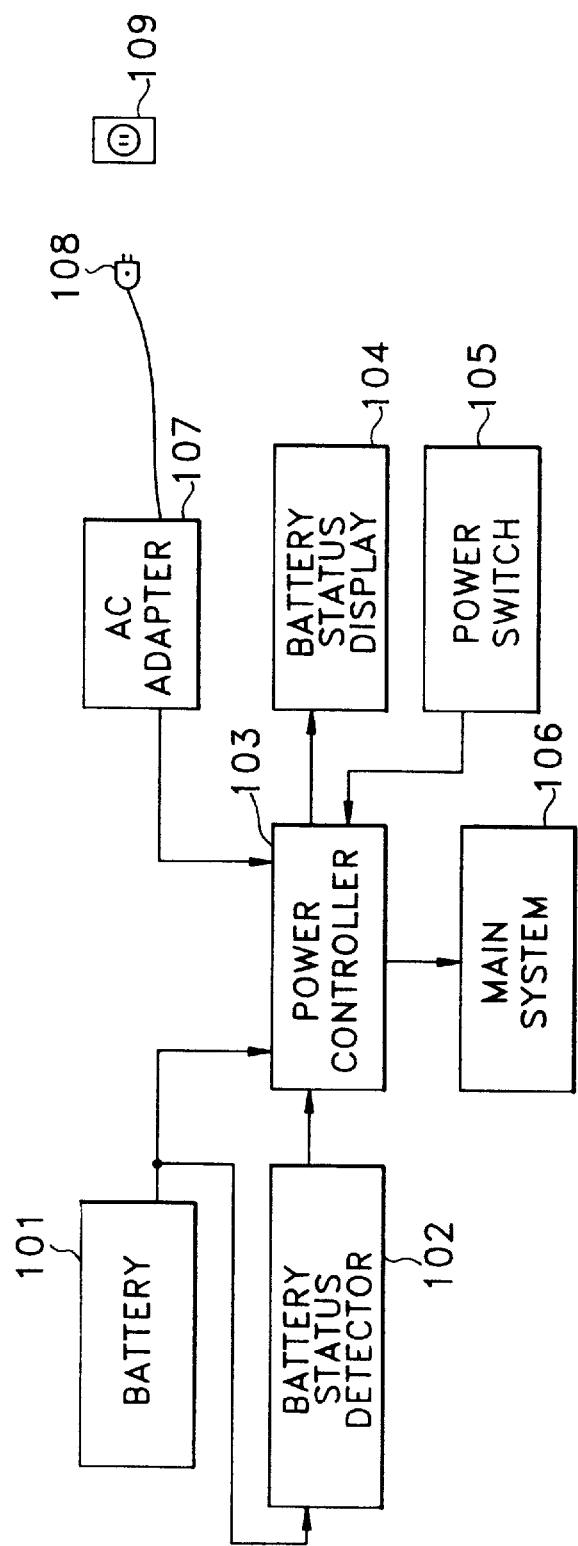
FIG. 1 is a block diagram of a conventional battery power system.

FIG. 1 is a block diagram of a conventional battery power system. The system includes a battery 101, a battery status detector 102, a power controller 103, a battery status display 104, a power switch 105, a main system 106, an AC adapter 107 and a plug 108.

In FIG. 1, battery status detector 102 compares the voltage output from battery 101 with a predetermined voltage and thereby checks the charged or discharged status of the battery. That is to say, if the voltage output from battery 101 is less than or equal to the predetermined voltage, it is determined that the battery is discharged. Otherwise, it is determined that the battery is charged. Then, the result is applied to power controller 103. Battery status display 104 displays the result detected from battery status detector 102, thus notifying the user of a discharged state of battery 101. Power switch 105 is operated to select the power supplied to main system 106, either from battery 101 or from an external power source via AC adapter 107 which converts alternating current (AC) power into direct current (DC) power. To supply external power to main system 106 through the AC adapter, plug 108 must be connected to an outlet 109.

Figure 2:
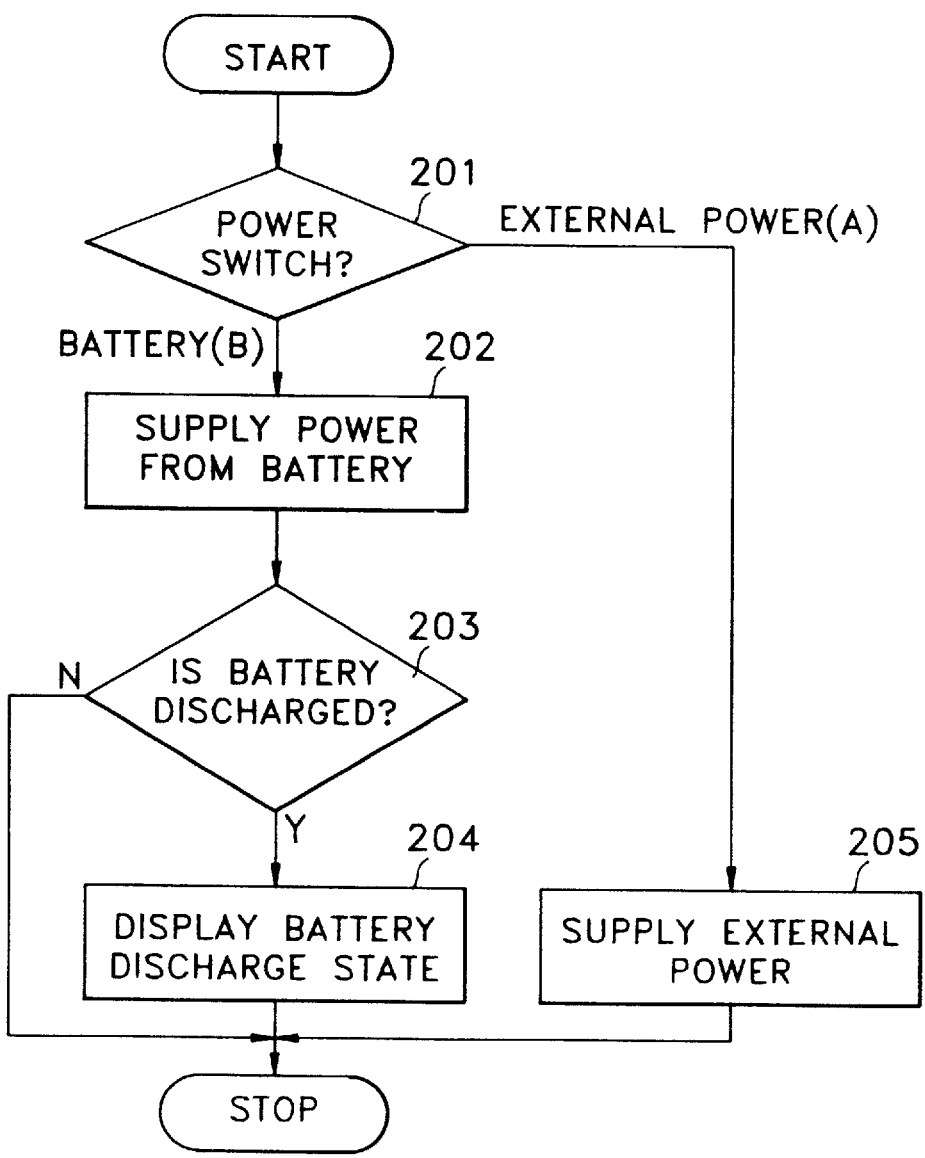
FIG. 2 is a flowchart for explaining the operation of the power controller shown in FIG. 1.

FIG. 2 is a flowchart for explaining the operation of the power controller shown in FIG. 1.

Referring to FIG. 2, step 201 determines whether battery power or external power has been selected, and the operation proceeds to step 202 if battery 101 is selected and to step 205 if external power is selected. In step 202, the battery power from battery 101 is supplied to main system 106, and in step 205, the external power is supplied to main system 106 via AC adapter 107. If it is determined in step 201 that battery power is selected, step 203 determines the charge status of the battery using the output signal of battery status detector 102. It battery 101 is discharged, the operation proceeds to step 204 where battery status display 104 displays the discharged status. The above steps are continuously carried out as long as power is supplied to power controller 103.

However, with the apparatus connected to an external source, the user may not properly set power switch 105 for external power, so that main system 106 still operates via battery power. Under these conditions, the main system 106 may be shut down without preparation, even though the discharged state of the battery 101 is displayed in step 204, whereby the data of main system 106 is lost.

Although not shown in FIG. 1, there is a conventional system having a standby battery. In such a case, although the power switch is not operated after step 204 is performed, the power is supplied from the standby battery. However, the conventional standby battery has only a small capacity, thereby enabling only about four to five minutes of normal battery use at a few amperes. Therefore, the user should carry out the battery replacement operation quickly and within a couple of minutes.

Figure 3:
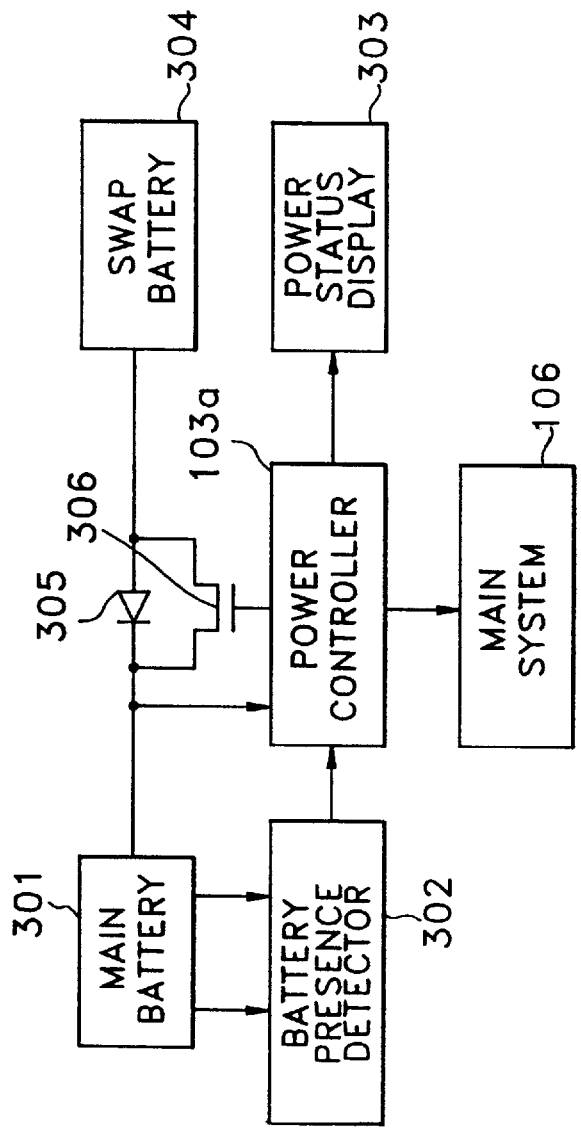
FIG. 3 is a block diagram of the battery power system according to a first embodiment of the present invention.

FIG. 3 is a block diagram of the battery power system according to a first embodiment of the present invention. The battery power system includes a main battery 301, a battery presence detector 302, a power controller 103a, a swap battery 304, a reverse-current blocking diode 305 and a field-effect transistor 306 connected in parallel, a main system 106, and a power status display 303. A first power line 307 connects the main battery 301 to the swap battery 304 through diode 305 and transistor 306. A second power line 308 connects the first power line 307 to the power controller 103a.

In FIG. 3, upon receiving power, main system 106 performs its various functions. In the case of a notebook computer, the main system includes the core logic, a hard disk drive (HDD), a floppy disk drive (FDD) and a liquid crystal panel, the supplied power being controlled by power controller 103a.

The swap battery 304, being internally installed and separate from main battery 301, has a current capacity and output voltage level which are somewhat less than the main battery and is connected to power controller 103a by the parallel connection of reverse-current blocking diode 305 and field-effect transistor 306.

The battery presence detector 302, which detects whether the main battery is installed, can be manufactured variously and one embodiment thereof will be described later with reference to FIGS. 4A and 4B.

The power status display 303 displays the installation status of main battery 301. For example, power status display 303, such as a light-emitting diode, is made to flash whenever main battery 301 is detached, and thereby prompt a user to reinstall the main battery.

The power controller 103a is composed of a power management processor which controls the power supplied to main system 106 and will now be described with reference to FIG. 5.

Figure 5:
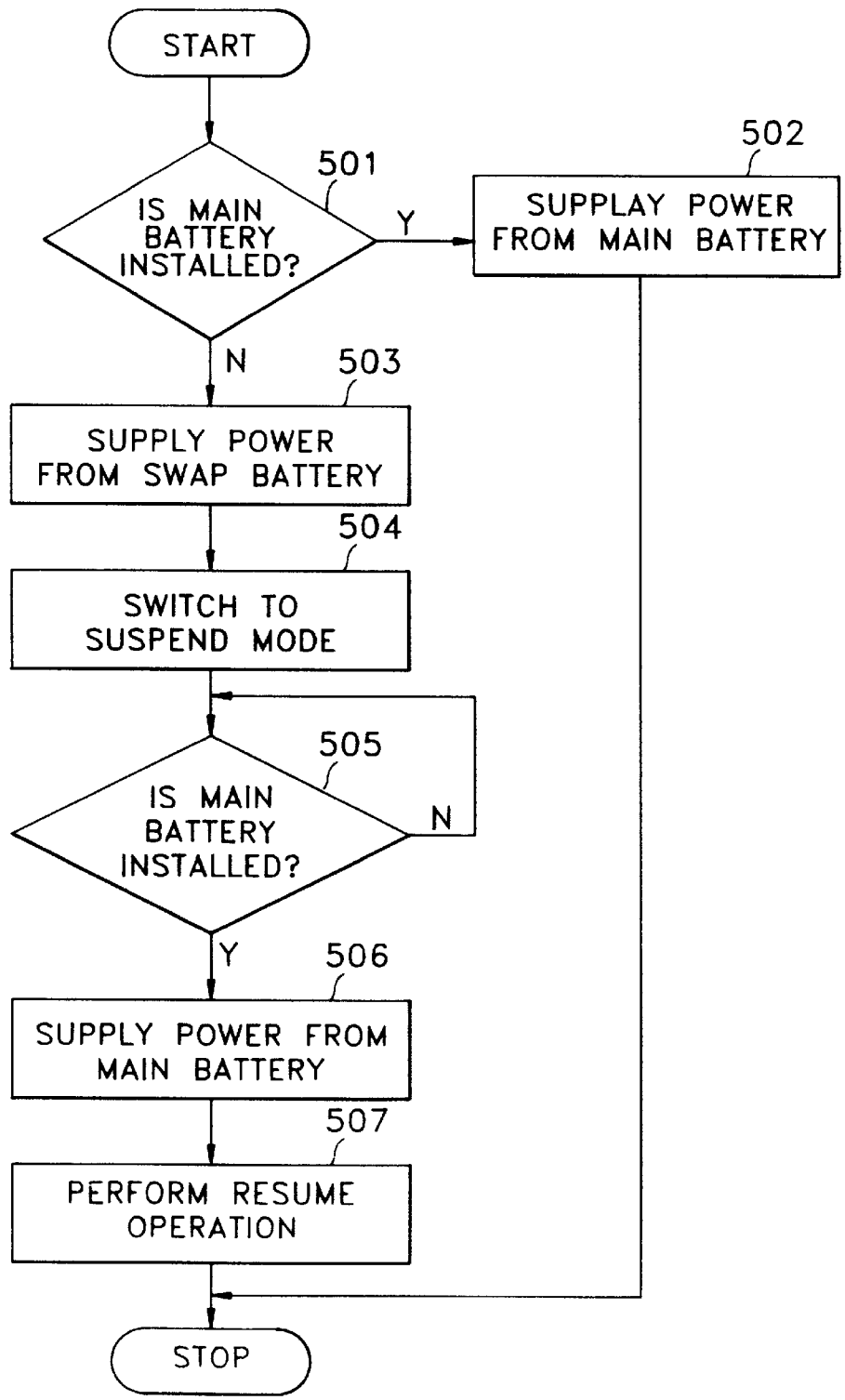
FIG. 5 is a flowchart for explaining the operation of the power controller shown in FIG. 3.

Referring to FIG. 5, in step 501, a logic signal is received from battery presence detector 302 in order to determine whether main battery 301 is installed. If the main battery 301 is installed, the process proceeds to step 502 whereby power is supplied from the main battery 301. At this time, since the output voltage of the main battery 301 is higher than that of the swap battery 304, the reverse-current blocking diode 305 is reverse-biased (off), so that there is no current output from the swap battery. However, if it is determined in step 501 that main battery 301 is not installed, i.e., the main battery has been removed, the process proceeds to step 503 and reverse-current blocking diode 305 conducts so that power continues to be supplied, but from swap battery 304, and the power status display 303 displays that main battery 301 has been detached. That is, if power controller 103a detects the removal of the main battery, field-effect transistor 306 is turned on to provide a continuous supply of power through the field-effect transistor 306. Then, if power controller 103a is equipped with a suspend mode function, step 504 switches the power supply mode to the suspend mode because the capacity of swap battery 304 is generally less than that of main battery 301. By switching to the suspend mode, the time during which power can be supplied from swap battery 304 becomes longer, so that a sufficient amount of time is secured for the user to exchange the main battery 301.

The power supply mode of the power controller is a predetermined mode in which only the necessary power is applied, depending on a detected status of system usage, thereby curbing the consumption of electricity. Such a feature is commonplace for any system whose power is supplied through batteries. Table 1 shows various power supply modes which may be adopted in a notebook computer system.

TABLE 1

| mode | Power Supply Status |
| --- | --- |
| "ON" | power supplied to all units normally |
| "DOZE" | CPU clock frequency lowered |
| "SLEEP" | CPU clock frequency lowered, liquid crystal panel turns off, and HDD motor stopped |
| "SUSPEND" | CPU, HDD, FDD, liquid crystal panel, etc. turned off, and DRAM, VRAM, etc. kept on |

This is only one example and various modes can be provided by the manufacturer. Here, the particular functions which are turned on or off are set according to the respective modes, but the suspend mode is generally provided by all manufacturers. In the suspend mode, all power is shut off except for that which is required for the continuation of system operations. For example, the processed data is placed in a predetermined area of DRAM where it is stored during the suspend mode. (A discussion of system suspend and resume operations can be found in U.S. Pat. No. 5,021,983.)

Referring again to FIG. 5, step 505 determines whether the user has reinstalled main battery 301, and if so, operation proceeds to step 506 where the power supply is switched so that power is again supplied from main battery 301. Then, step 507 performs a resume operation which restores the system to the original mode, that is, the mode prior to step 504. Here, the data stored in the predetermined DRAM memory area is reloaded in the operation areas. The steps of FIG. 5 are performed as long as the power is supplied.

In other words, power controller 103a of FIG. 3 controls the power to be supplied from main battery 301 whenever battery presence detector 302 detects the proper installation of main battery 301, and controls the power to be supplied from the swap battery 304 if it is detected that the main battery 301 has been detached.

Figure 4A:
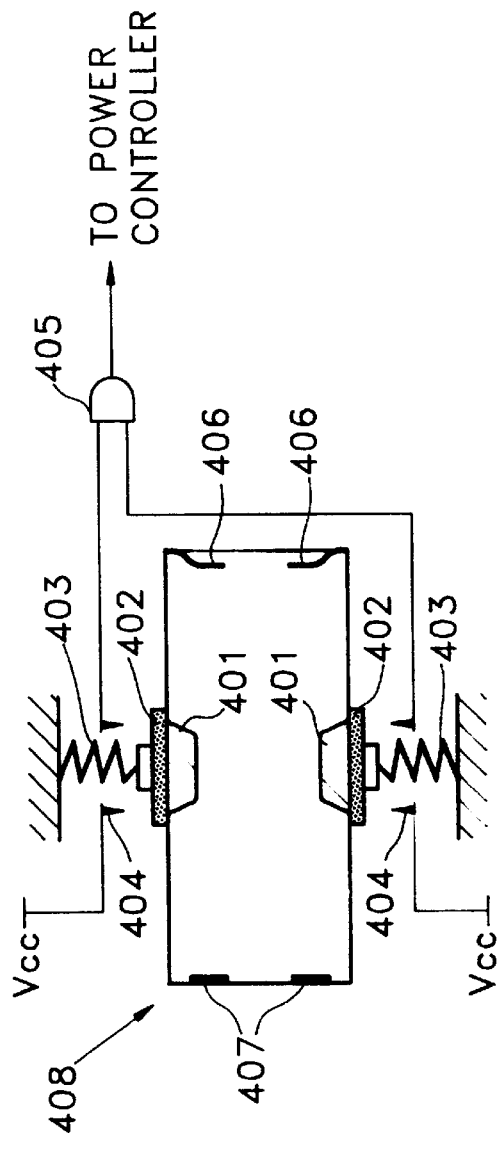
FIGS. 4A and 4B are diagrams showing the structure of the battery presence detector shown in FIG. 3 according to a first embodiment of the present invention.
Figure 4B:
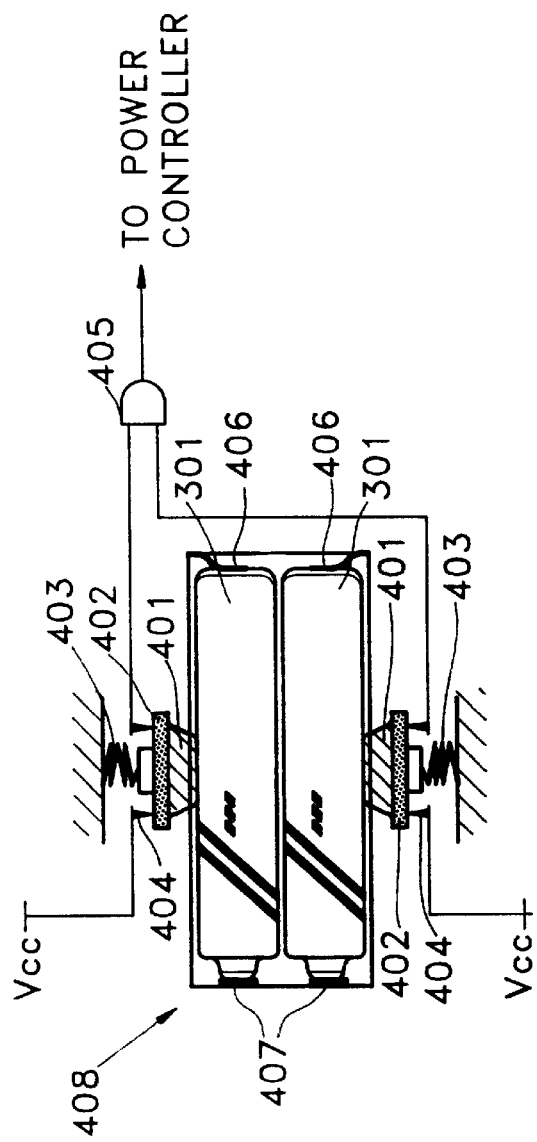

FIGS. 4A and 4B show the structure of battery presence detector 302 according to one embodiment of the present invention, for determining whether main battery 301 is installed. Here, conductive surfaces 402 on the rear side of hooks 401 are supported by springs 403, with the position of each hook 401 depending on the installation state of main battery 301. Thus, with main batteries 301 installed, conductive surfaces 402 are connected to a pair of contact points 403 to complete a circuit and apply a predetermined signal (Vcc) to logical product means 405. The logical product means 405 receives the predetermined signals and performs a logical multiplication operation becoming non-active if either of the main batteries 301 is detached. Reference numerals 406 and 407 denote contact terminals and reference numeral 408 denotes a battery holder. Battery presence detector 302 may also be realized via optical means instead of the above construction.

Figure 6:
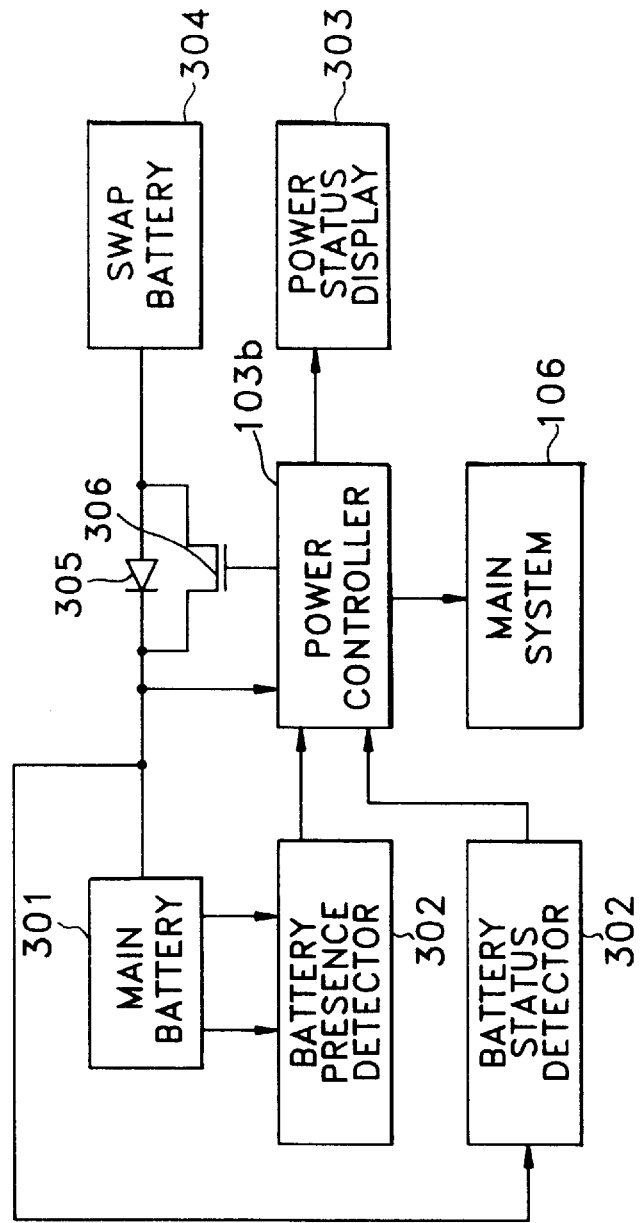
FIG. 6 is a block diagram of the battery power system according to a second embodiment of the present invention.

FIG. 6 is a block diagram of the battery power system according to a second embodiment of the present invention. In addition to the components shown in FIG. 3, the system of FIG. 6 further includes a battery status detector 102. Here, battery status detector 102 compares the voltage output from main battery 301 with a predetermined voltage to check the charged or discharged status thereof and outputs the status signal to a power controller 103b. With such a composition, the power status display 303 can perform the additional function of displaying the charge/discharge status of main battery 301 so that the user can visually confirm the main battery status, thereby facilitating the timely exchange of the main batteries.

Figure 7:
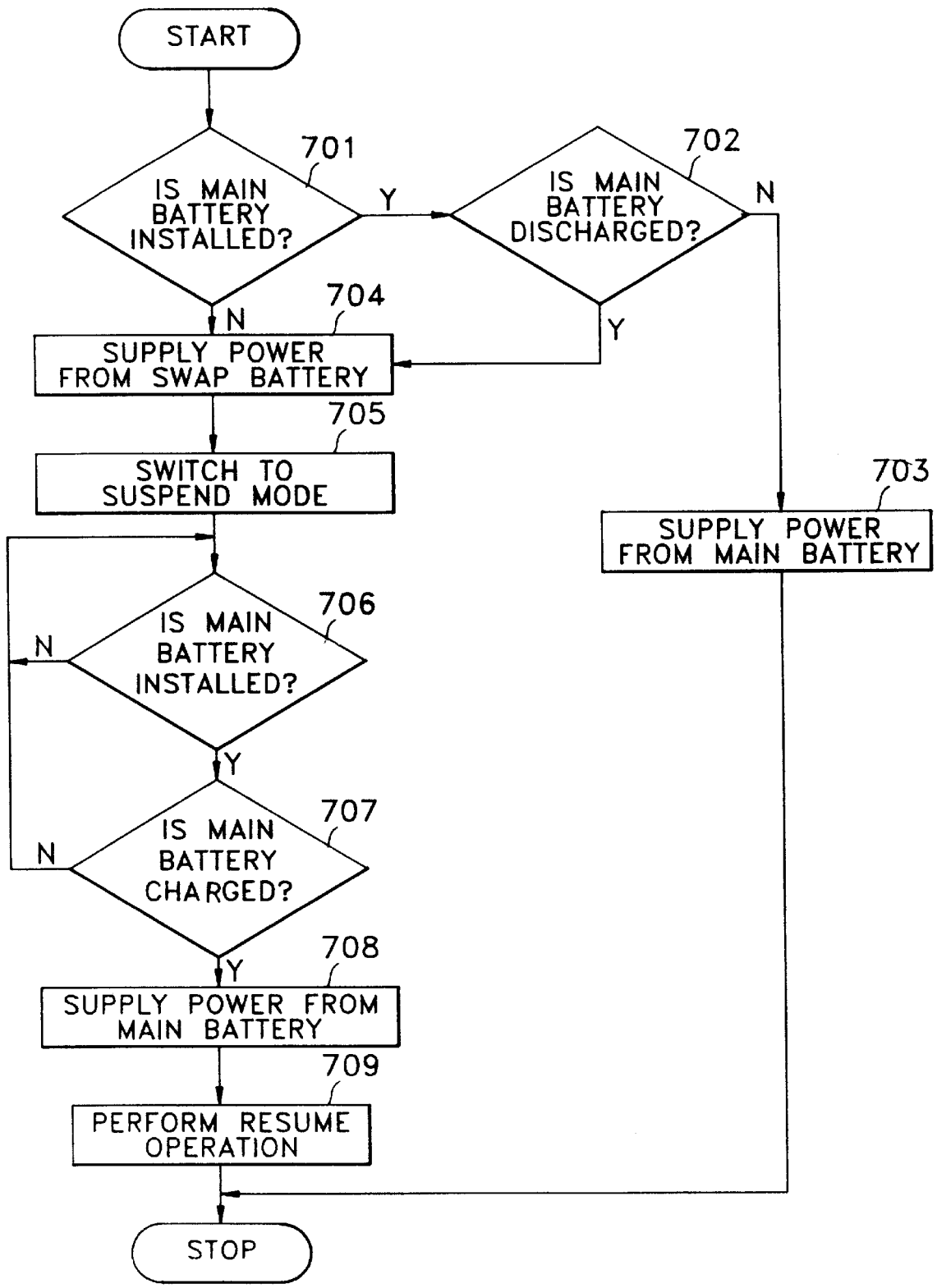
FIG. 7 is a flowchart for explaining the operation of the power controller shown in FIG. 6.

FIG. 7 is a flowchart for explaining the operation of power controller 103b of FIG. 6.

Referring to FIG. 7, step 701 determines whether main battery 301 is installed, based on the output of battery presence detector 302. If main battery 301 is installed, the process proceeds to step 702, and if not, power status display 303 displays that main battery 301 is detached and the process proceeds to step 704. In step 702, it is determined whether the installed main battery 301 is charged or discharged, based on the output of battery status detector 102. If main battery 301 is charged, the process proceeds to step 703 where power is supplied from the main battery, but if step 702 determines that main battery 301 is discharged, the power status display 303 indicates the discharged state thereof and the process advances to step 704. Therefore, unless a fully charged main battery is properly installed, step 704 is performed to switch the power supply path so that the power is supplied from swap battery 304. Then, in the event of power controller 103b being equipped with the function of supplying power according to a predetermined mode, i.e., the suspend mode, step 705 is performed to switch the power supply mode as in step 504 of FIG. 5. Thereafter, step 706 determines whether main battery 301 is reinstalled, and if so, the process proceeds to step 707 which checks the charge/discharge condition of the main battery. If it is determined in step 707 that the installed main battery 301 is charged, the process proceeds to step 708 which switches the power supply to the main battery. Thereafter, the process proceeds to step 709 in which a resume operation as described with respect to step 507 of FIG. 5 is performed. The above steps are performed as long as power is supplied to power controller 103b.

That is, power controller 103b functions such that when main battery 301 is installed and charged, the system power is supplied from the main battery. Otherwise, the power is supplied from swap battery 304.

Figure 8:
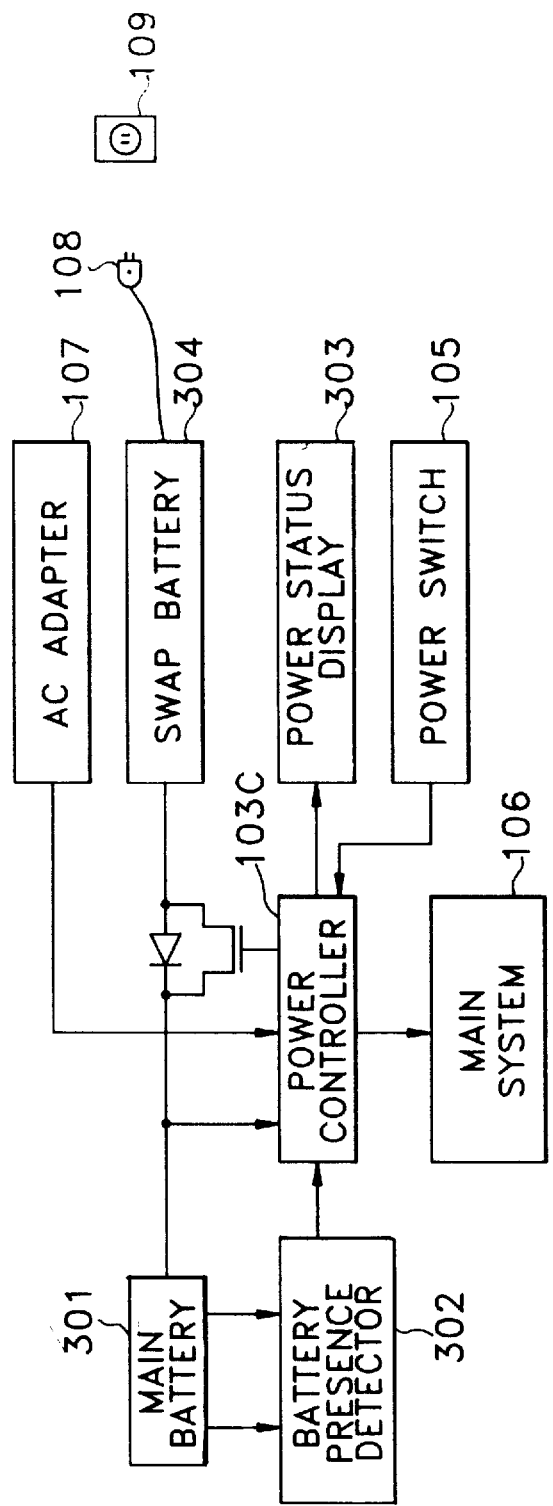
FIG. 8 is a block diagram of the battery power system according to a third embodiment of the present invention.

FIG. 8 is a block diagram of the battery power system according to a third embodiment of the present invention. In addition to the components shown in FIG. 3, the system of FIG. 8 further includes an AC adapter 107 with a power plug and a power switch 105. The AC adapter 107 having a plug 108 is connected with an outlet 109 as an external power source. Here, power switch 105 is connected to a power controller 103c and allows the user to select the power supply source. For example, in the case of state "A" of power switch 105, external power is supplied through AC adapter 107, and in the case of state "B," power is supplied from either main battery 301 or swap battery 304. With such a configuration, swap battery 304 is automatically converted to a charge mode and charged when external power is supplied and the swap battery itself is not used.

The operation of power controller 103c having the above configuration will be described with reference to FIG. 9.

Figure 9:
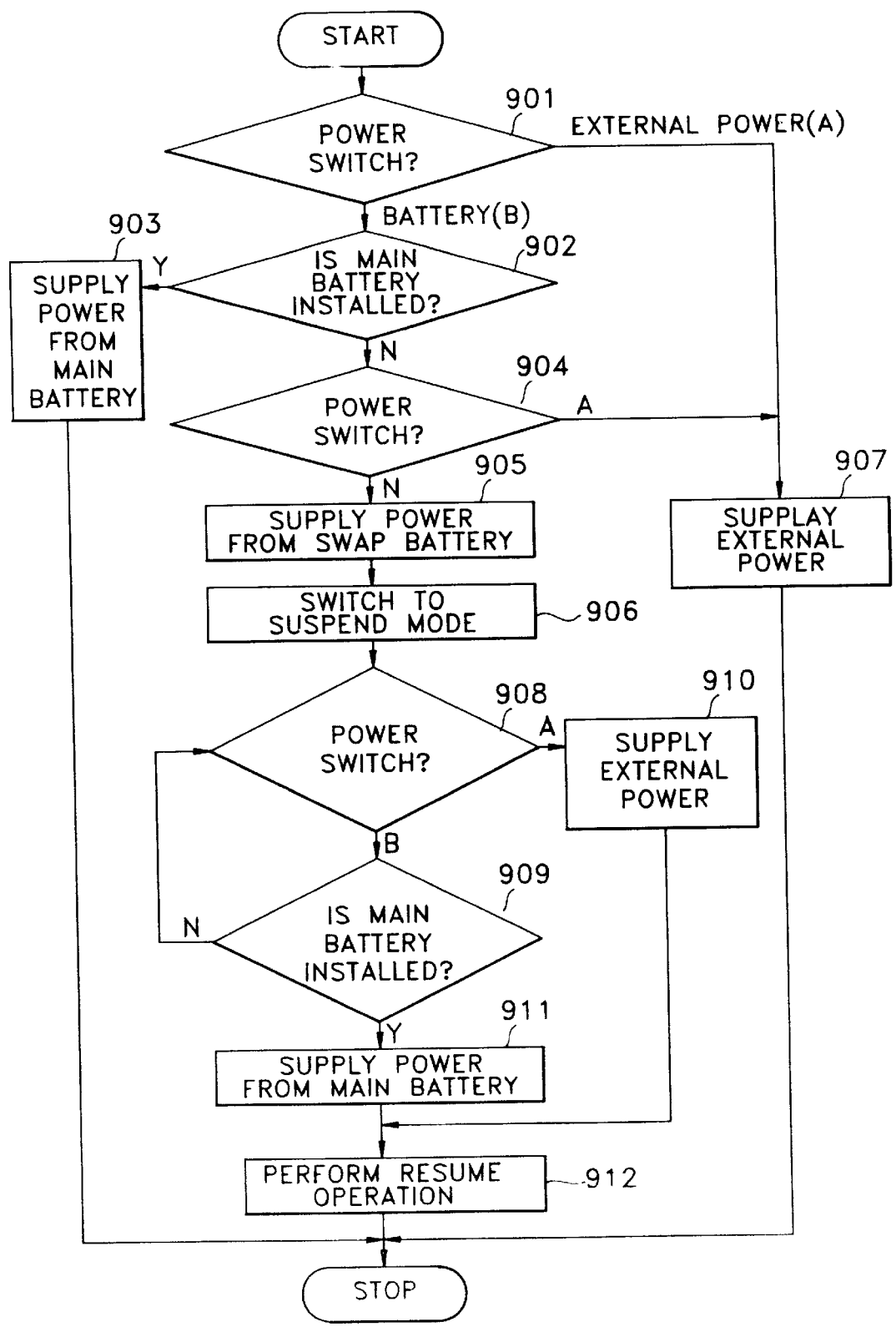
FIG. 9 is a flowchart for explaining the operation of the power controller shown in FIG. 8.

In FIG. 9, step 901 determines whether the battery or the external power source is selected. If power switch 105 is switched to the battery (state "B"), the process proceeds to step 902, but if the power switch 105 is switched to the external power source (state "A"), the process proceeds to step 907 and external power is supplied to the system. Meanwhile, when the battery is selected, step 902 determines whether main battery 301 is installed, based on the output of battery presence detector 302. If main battery 301 is installed, the process proceeds to step 903 and power is supplied from the main battery 301. Otherwise, after power status display 303 displays that main battery 301 is detached, the process proceeds to step 904 where it is again determined whether power switch 105 is switched to state "B" or to state "A." If external power is selected, the process proceeds to step 907 in which the external power is applied. On the contrary, if the battery is selected (state "B"), step 905 supplies power from swap battery 304 and the suspend mode is set in step 906. Then, in step 908, it is again determined whether power switch 105 is switched to the battery (state "B") or the external power source (state "A"). If external power is selected, the process proceeds to step 910 and external power is supplied, and then the process proceeds to step 912. Otherwise, the process advances to step 909 which determines whether main battery 301 is installed. If it is determined in step 909 that main battery 301 is installed, the process proceeds to step 911 in which power is supplied from main battery 301 and thereafter proceeds to step 912. Otherwise, the process returns to step 908. Step 912 is performed when the power is first supplied from the swap battery and then from the external power or main battery 301 and thereafter the resume operation is performed. The above steps are performed as long as power is supplied to power controller 103c.

In the operation of power controller 103c, power is supplied through AC adapter 107 when power switch 105 is set for external power. However, if power switch 105 is switched to the battery, the power is supplied from main battery 301 only if the output of battery presence detector 302 indicates that the main battery is installed. Otherwise, the power is supplied from swap battery 304. Also, the suspend mode is operated when the power is supplied from swap battery 304, and the resume operation is performed when the power supply changes back from swap battery 304.

Figure 10:
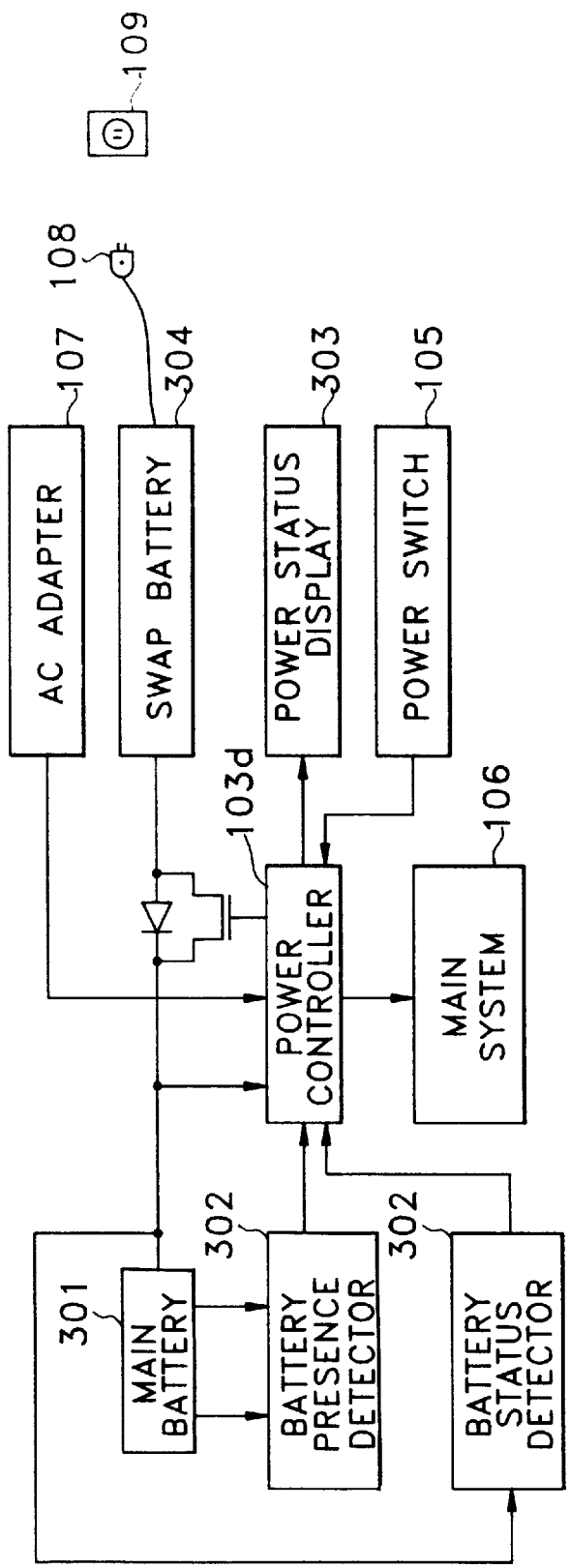
FIG. 10 is a block diagram of the battery power system according to a fourth embodiment of the present invention.

FIG. 10 is a block diagram of the battery power system according to a fourth embodiment of the present invention. In addition to the components shown in FIG. 8, the system of FIG. 10 further includes a battery status detector 102. Here, battery status detector 102 detects the charge/discharge status of main battery 301, as described with respect to FIG. 6, and supplies the status signal to a power controller 103d. Also, in such a configuration, if external power is supplied and the swap battery 304 itself is not used, similar to the case of FIG. 8, the swap battery is automatically converted into a charge mode and charged.

The operation of power controller 103d will be described with reference to FIG. 11.

Referring to FIG. 11, step 1101 determines which power source is selected by power switch 105. If power switch 105 is set for battery operation (state "B"), the process proceeds to step 1102. If power switch 105 is set for external power operation (state "A"), the process proceeds to step 1114 and external power is supplied. Meanwhile, if power switch 105 selects the battery, step 1102 determines whether main battery 301 is installed based on the output of battery presence detector 302. Thus, if main battery 301 is installed, the process proceeds to step 1103 which determines whether the installed main battery 301 is charged or discharged based on the output of battery status detector 102. On the other hand, if main battery 301 is detached, power status display 303 displays this information and the process proceeds to step 1104. If it is determined in step 1103 that main battery 301 is discharged, battery status detector 102 displays this information and the process proceeds to step 1114. If it is determined that main battery 301 is charged, the process proceeds to step 1113 and the power is supplied from the main battery. In step 1104, it is again determined whether power switch 105 is set to state "B" or state "A." If external power is selected (state "A"), the process proceeds to step 1114 and external power is supplied. On the contrary, if the battery is selected (state "B"), the power is supplied from swap battery 304 in step 1105 and then the suspend mode function is performed in step 1106. In step 1107, the state of power switch 105 is again determined. If external power is selected, the process proceeds to step 1111 and external power is supplied, and then the process proceeds to step 1112. Otherwise, the process proceeds to step 1108 which determines whether main battery 301 is installed. If it is determined in step 1108 that main battery 301 is installed, the process proceeds to step 1109 to then determine whether the installed main battery 301 is charged or discharged. Here, if it is determined that main battery 301 is not installed or that an installed main battery is not charged, the process returns to step 1107, but if the installed main battery 301 is charged, the process proceeds to step 1110 and power is supplied from main battery 301. Step 1112 is performed when the power is first supplied from the swap battery and then from the external power or main battery 301 and thereafter the resume operation is performed. The above steps are performed as long as the power is supplied to power controller 103d.

As described above, the intelligent battery power system according to the present invention can maintain data by means of a swap battery by performing a suspend operation, even when the main battery is removed, and can lengthen the life of the swap battery.

What is claimed is:

1. A battery power system comprising:
a replaceable main battery having a first power supplying capacity, and a swap battery having a second power supplying capacity smaller than the first power supplying capacity, for supplying power to a main system, wherein the swap battery is built-in in the battery power system;
battery presence detecting means for detecting whether said main battery is detached from said battery power system;
power control means for supplying power from said swap battery to the main system when said battery presence detecting means detects that said main battery is detached from said battery power system, and for interrupting power from said swap battery and supplying power from said main battery to the main system when said battery presence detecting means detects that said main battery is not detached from said battery power system;
an AC adapter, connected to said power control means, for providing power from an AC power line;
a first power line connecting said main battery to said swap battery;
a second power line connecting said first power line to said power control means; and
a power switch connected to said power control means for selecting supply of power to said power control means from said AC adapter and from said second power line, said power control means 1) operating said battery power system in a suspend mode and supplying power from said swap battery to the main system when said main battery detecting means detects that said main battery is detached from said battery power system and when said power switch selects supply of power to said power control means from said second power line, 2) interrupting power from said swap battery and supplying power from said main battery to operate said battery power system in a resume mode when said battery presence detecting means detects that said main battery is not detached from said battery power system and when said power switch selects supply of power to said power control means from said second power line, and 3) operating said battery power system in the resume mode by supplying power to the main system from said AC adapter when said power switch selects supply of power to said power control means from said AC adapter.

2. The battery power system as claimed in claim 1 comprising power status display means for displaying whether said main battery is detached from said battery power system.

3. The battery power system of claim 1 wherein operation in the suspend mode includes reducing power consumption.

4. The battery power system as claimed in claim 1 wherein the main battery, when charged, produces a higher voltage than the swap battery.

5. A battery power system comprising:
a replaceable main battery having a first power supplying capacity, and a swap battery having a second power supplying capacity smaller than the first power supplying capacity, for supplying power to a main system, wherein the swap battery is built-in in the battery power system;
battery presence detecting means for detecting whether said main battery is detached from said battery power system;
battery status detecting means for detecting whether said main battery is charged or discharged;
power control means for supplying power from said swap battery to the main system when said main battery is determined to be 1) detached from said battery power system by said battery presence detecting means, or 2), if said main battery is determined not to be detached from said main battery power system, said main battery is determined to be discharged by said battery status detecting means, and for interrupting power from said swap battery and supplying power from said main battery to the main system when said battery presence detecting means detects that the main battery is not detached from said battery power system and said battery status detecting means determines that said main battery is charged;

an AC adapter connected to said power control means;

a first power line connecting said main battery to said swap battery; and a second power line connecting said first power line to said power control means, said power control means 1) operating said battery power system in a suspend mode and supplying power from said swap battery to the main system when i) a power switch supplies power from a second power line to said power control means and ii) said main battery is determined to be detached from said battery power system by said battery presence detecting means, or, if said main battery is determined not to be detached from said battery power system, said main battery is determined to be discharged by said battery status detecting means, 2) interrupting power from said swap battery and supplying power from said main battery to the main system to operate said battery power system in a resume mode when i) said battery presence detecting means detects that said main battery is not detached from said battery power system, ii) said battery status detecting means determines that said main battery is charged, and iii) said power switch supplies power from said second power line, and 3) operating said battery power system in the resume mode by supplying power from said AC adapter when said power switch supplies power from said AC adapter.

6. The battery power system as claimed in claim 5 comprising power status display means for displaying whether said main battery is detached from said battery power system and whether said main battery is charged or discharged.

7. The battery power system of claim 5 wherein operation in the suspend mode includes reducing power consumption.

8. The battery power system as claimed in claim 5 wherein said main battery, when charged, produces a higher voltage than said swap battery.

9. A battery power system comprising:

a replaceable main battery having a first power supplying capacity, and a swap battery having a second power supplying capacity smaller than the first power supplying capacity, for supplying power to a main system, wherein the swap battery is built-in in the battery power system;

battery presence detecting means for detecting whether said main battery is detached from said battery power system;

power control means for supplying power from said swap battery to the main system when said battery presence detecting means detects that said main battery is detached from said battery power system, and for interrupting power from said swap battery and supplying power from said main battery to the main system when said battery presence detecting means detects that said main battery is not detached from said battery power system;

an AC adapter, connected to said power control means, for providing power from an AC power line;

a first power line connecting said main battery to said swap battery;

a second power line connecting said first power line to said power control means; and a power switch connected to said power control means for selecting supply of power to said power control means from said AC adapter and from said second power line, said power control means operating said battery power system in a suspend mode and supplying power from said swap battery to the main system when said main battery detecting means detects that said main battery is detached from said battery power system and when said power switch selects supply of power to said power control means from said second power line.

10. The battery power system as claimed in claim 9 comprising power status display means for displaying whether said main battery is detached from said battery power system.

11. The battery power system of claim 9 wherein operation in the suspend mode includes reducing system power consumption.

12. The battery power system as claimed in claim 9 wherein said main battery, when charged, produces a higher voltage than said swap battery.

* * * * *